Feb. 11, 1969 J. J. MOONEY, JR., ET AL 3,426,621
POWER TRAIN
Original Filed Oct. 23, 1965
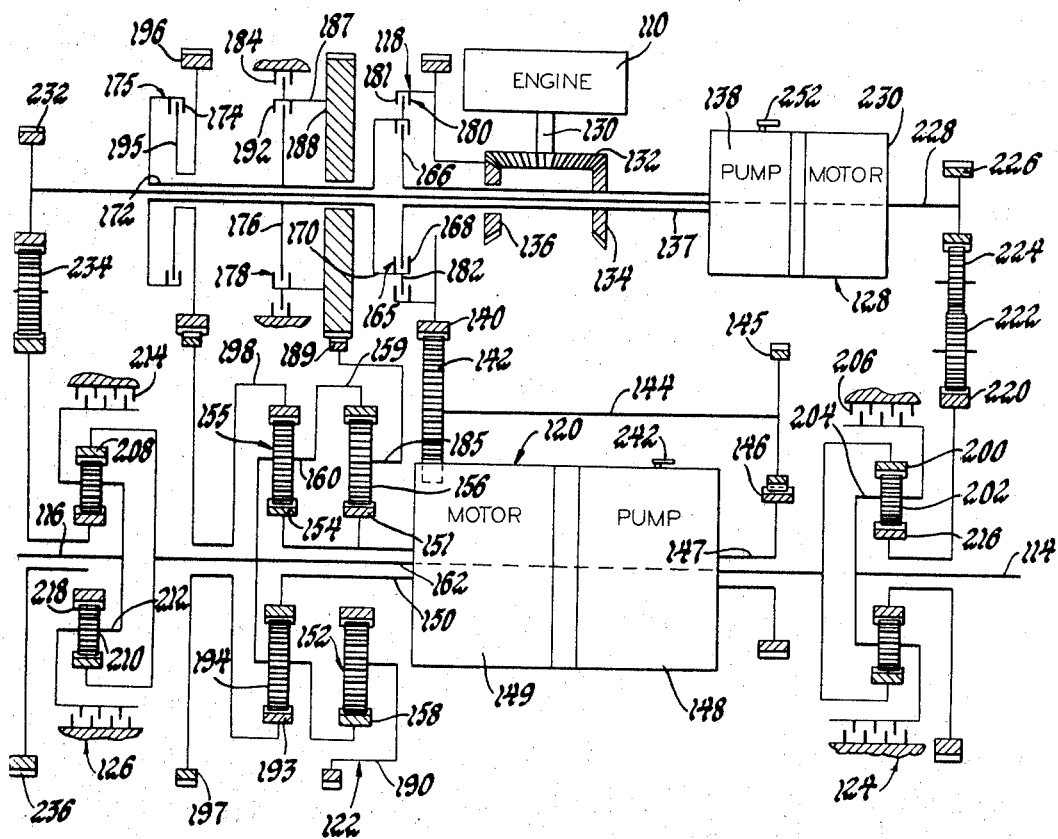
INVENTORS.
James J. Mooney, Jr. &
Marion D. Smith
a. M. Heiter
ATTORNEY

United States Patent Office 3,426,621
Patented Feb. 11, 1969

3,426,621
POWER TRAIN
James J. Mooney, Jr. and Marion D. Smith, Indianapolis, Ind., assignors to General Motors Corporation, Detroit, Mich., a corporation of Delaware
Application Sept. 28, 1967, Ser. No. 671,464, which is a continuation of application Ser. No. 502,863, Oct. 23, 1965. Divided and this application Feb. 23, 1968, Ser. No. 707,633
U.S. Cl. 74—720.5    2 Claims
Int. Cl. F16h *37/06*

ABSTRACT OF THE DISCLOSURE

A single input, dual output power train which in the preferred embodiment has a single hydrostatic propulsion unit combined with planetary gearing to provide full hydrostatic drive and hydromechanical drive with synchronous drive establishing device shifting. A separate hydrostatic steer unit is combined with the gearing to provide steering.

---

This application is a division of Ser. No. 671,464, filed Sept. 28, 1967, which is a continuation of Ser. No. 502,863, filed Oct. 23, 1965, now abandoned.

This invention relates to power trains and more particularly to a single input, dual output power train providing full hydrostatic drive, hydromechanical drive and separate hydrostatic steering.

The invention, as illustrated in the preferred embodiment in a track-laying vehicle, provides the same three drive ranges in forward and reverse with full hydrostatic drive in low range and split torque or hydromechanical drive in intermediate and high range with hydrostatic steering provided in all ranges. The propulsion drive is by a single hydrostatic propulsion unit acting with planetary range gearing which provides synchronized drive establishments at optimum shift points. The single output from this combination is delivered to like planetary steer units which also serve as output gearing to deliver their output as propulsion drive to the vehicle's two tracks. Steering is provided by an input driven hydrostatic steer unit which provides steer inputs to the planetary steer units to provide controlled differential steering. All of the propulsion drives are established by single drive establishing device engagement to simplify shift control as compared to the two outputs having separately controlled drives where drive engaging devices in the separate drives would be timed for simultaneous engagement to avoid weaving the vehicle in straight forward or reverse drive. Another advantage of the power train according to the present invention is that the hydrostatic steer unit does not transmit power for the propulsion drive so its power capacity can be smaller than the hydrostatic propulsion unit.

An object of the present invention is to provide an improved single input, dual output power train providing a full hydrostatic drive, hydromechanical drive with synchronous drive establishment for shifting between ranges and separate hydrostatic steering.

Another object of the present invention is to provide in a single input, dual output power train, a single hydrostatic propulsion unit cooperating with planetary gearing including output gearing to provide a full hydrostatic drive in a low drive range and hydromechanical drive in a higher drive range with range shifting accomplished by drive establishing devices speed synchronized at optimum shift points and a single hydrostatic steer unit cooperating with the output gearing to provide differential steering in all drive ranges.

These and other objects of the invention will be more apparent from the following description and drawing of the preferred embodiment of the invention.

The drawing diagrammatically shows the preferred embodiment of a power train according to the present invention.

The preferred embodiment of the power train according to the present invention provides the same three drive ranges in forward and reverse with full hydrostatic drive in low range and split torque drive in intermediate and high range. Propulsion is accomplished by a single hydrostatic pump and motor unit in combination with planetary gearing while steering is obtained with a steer hydrostatic pump and motor unit combined with the gearing, steering being of the controlled differential type. Referring to the drawing prime mover 110 is operatively connected to the right and left track-powering output shafts 114, 116 respectively by an integrated forward and reverse drive clutch assembly 118, a single hydrostatic pump and motor or propulsion unit 120, a common power combining planetary gear unit 122 and a right and a left speed differential or steer planetary gear unit 124, 126. A single hydrostatic pump and motor or steer unit 128 is combined with the steer units 124, 126 for steering operation. Each hydrostatic unit is of conventional design with the pump having infinitely variable displacement and the motor having fixed displacement, the speed and direction of the motor output being controlled by the pump's displacement control mechanism.

Input to the propulsion unit 120 and the steering unit 128 is provided by the prime mover output shaft 130 being connected to drive a bevel gear 132. Gear 132 meshes at diametrically opposite sides with a bevel gear 134 and a bevel gear 136. Gear 134 is connected by a sleeve shaft 137 to the infinitely variable displacement pump 138 of unit 128 whereby the pump is continuously driven by the prime mover. The opposite gear 136 is connected to drive a spur gear 140 which is located concentric with gear 136 and meshes with a spur gear 142. Gear 142 is connected to drive a counter shaft 144 which shaft is connected to drive a spur gear 145 in mesh with a spur gear 146. Gear 146 is connected by a sleeve shaft 147 to drive the pump 148 of propulsion unit 120 and thus the pump 148 is continuously powered by the prime mover.

Describing the propulsion drive in further detail, the fixed displacement, propulsion motor 149 powered by infinitely variable displacement pump 148 is connected by a sleeve shaft 150 to the sun gear 151 of gear set 152 and also to the sun gear 154 of gear set 155. In gear set 152 pinions 156 mesh with sun gear 151 and with a ring gear 158 which is connected by a drum 159 and the carrier 160 of gear set 155 to a propulsion output shaft 162. Shaft 162 extends freely through sleeve shaft 150, motor 149, pump 148 and the pump sleeve shaft 147 and is connected at its opposite ends to the steer units 124, 126.

Mechanical drive to the power combining propulsion gear unit 122 is provided by the forward and reverse drive assembly 118 and three drive range clutches located between assembly 118 and unit 122. The forward and reverse assembly 118 comprises a forward drive clutch 165 whose clutch driving member 166 is connected to be driven by gear 134 by an extension of sleeve shaft 137 which extends freely through gear 136. The forward clutch driven member 168 is connected by a drum 170 to drive a sleeve shaft 172 which shaft is connected to drive the clutch driving member 174 of an intermediate drive establishing clutch 175 and the clutch driving member 176 of a high drive establishing clutch 178. A reverse drive clutch 180 is assembly 118 is located outward of and concentric with forward drive clutch 165 and has its clutch driving member 181 connected by the gear 140 to the gear 136 and thus is driven in a direction opposite the clutch driving member 166 of the forward drive clutch 165. The reverse clutch driven member 182 is connected by drum 170 to drive the shaft 172 and thus the clutch driving member 174 of the intermediate drive clutch 175 and the high drive clutch 178. A low brake 184 is connected to brake the carrier 185 supporting the pinions 156 in gear set 122 by being connected by a drum 187 to a spur gear 188 rotatable about shaft 172. Gear 188 meshes with a gear 189 which is connected by a drum 190 to carrier 185. The driven clutch plate member 192 of the high drive clutch 178 is also connected to the drum 187 and thus to the carrier 185. The intermediate clutch drive goes to the ring gear 193 of gear set 155 which ring gear is in mesh with pinions 194 carried by the ouput carrier 160, the pinions also being in mesh with sun gear 154. In this intermediate clutch drive, the intermediate clutch driven member 195 is connected to drive a spur gear 196 which is rotatable about shaft 172 and in mesh with a spur gear 197 rotatable about shaft 162. Gear 197 is connected by a drum 198 to ring gear 193.

In the drives to the output shafts the right-hand end of shaft 162 is connected to drive ring gear 200 of the right steer unit 124 which ring gear meshes with pinions 202 journaled on an output carrier 204 connected to the output shaft 114. A vehicle brake 206 is connected to brake the right output shaft 114 through the carrier 204. Similarly, the left-hand end of shaft 162 is connected to drive ring gear 208 of the left steer unit 126 which ring gear meshes with pinions 210 journaled on an output carrier 212 connected to drive the left output shaft 116 which is axially aligned with the right output shaft 114. A vehicle brake 214 is connected to brake the left output shaft 116 through the carrier 212. The sun gear 216 of the right steer unit 124 and the sun gear 218 of the left steer unit 126 are connected by a direction reversing gear train. This gear train has at its right end a spur gear 220 connected to sun gear 216 and in mesh with an idler gear 222 which meshes with another idler gear 224. Gear 224 meshes with a gear 226 which is connected to the right end of a countershaft 228 operatively associated with the fixed displacement motor 230 of steer unit 128 and extending freely through pump 138, sleeve shaft 137 and sleeve shaft 172 to be connected at its left end with a spur gear 232, shafts 137, 172 and 228 being located parallel to shafts 114, 147, 150, 162 and 116. Gear 232 meshes with an idler gear 234 on the left side which gear 234 meshes with a gear 236 connected to the left steer sun gear 218.

Describing now the operation in neutral either the forward drive clutch 165 or the reverse drive clutch 180 may be engaged and all drive range establishing devices are disengaged to disconnect both the hydrostatic and mechanical power flow paths from the output shafts. In neutral, the propulsion pump 148 and the steering pump 138 are motored by the prime mover 110 and the propulsion unit 120 is available for subsequent establishment of hte drive ranges and the steer unit 128 is available for subsequent steering which will now be described.

With no propulsion drive to the propulsion power shaft 162 and on conditioning of the hydrostatic steer unit 128 by its pump displacement control 252 to power the shaft 228 in either direction, the steer ring gears 200, 208, since they are connected by the shaft 162, provide reaction in the steer units. One of the steer sun gears 218, 216 is driven in one direction and the other steer sun gear is driven in the opposite direction at the same speed by its gear train connection which includes the steer motor driven shaft 228 and there is provided true pivot steer about the vehicle's center. When shaft 228 is powered by motor 230 in the forward direction, the right output shaft 114 is driven at a reduced speed in the reverse direction and the left output shaft is driven at this same reduced speed in the forward direction. Converse rotation of the output shafts occurs when shaft 228 is powered in the reverse direction.

In the following descriptional operation of low, intermediate and high drive range operation the steer unit 128 is conditioned so that the shaft 228 is not powered by the steer motor 230, the description of steering operation in all drive ranges being deferred until later. In low drive range either the forward drive clutch 165 or the reverse drive clutch 180 is engaged for reasons which will become more apparent later and the intermediate clutch 175 and high clutch 178 are disengaged to disconnect the mechanical drive paths. The low drive brake 184 is engaged in the low drive range to hold carrier 185 and the propulsion motor shaft 150 is powered by control of the propulsion unit pump displacement control 242 to drive the sun gear 151 from zero to maximum motor speed. With the sun gear 151 driven in one direction and the carrier 185 held, the ring gear 158 and connected shaft 162 and steer ring gears 200, 208 are caused to rotate in the opposite direction at a reduced speed. Since the steer sun gears 216, 218 are connected by their gear train, they provide reaction and the steer pinions 202, 210 walk about their steer sun gears to cause the carriers 204, 212 and their connected output shafts to rotate in the same direction at a reduced speed.

During operation in the low drive range the other sun gear 154 is rotating at motor speed and in the same direction and the carrier 160 is rotating at output speed in the opposite direction and these rotations combine in the gear set 155 to cause the ring gear 193 to rotate at an intermediate speed in the opposite direction. The ratios of the planetary gearing (gear sets 155, 152), the geared drive between the ring gear 193 and the intermediate clutch driven member 195 (gears 197, 196) and the geared drive between the input shaft 130 and intermediate clutch driving member 174 (gears 132, 134, 136) are determined so that when the motor speed reached its maximum value in the one direction, the clutch driven member 195 of the disengaged intermediate clutch 175 is driven at the same speed and in the same direction as the intermediate clutch driving member 174 when sleeve shaft 172 is driven in the same direction as the motor shaft 150.

Thus, when the motor shaft 150 is driven, in what is described as the reverse direction, the output shafts 114 and 116 are driven in the forward direction and the intermediate clutch members are driven in the reverse direction and vice versa. Accordingly, for a low forward drive the hydrostatic propulsion unit 120 is conditioned to power the shaft 150 in the reverse direction and for a low reverse drive the hydrostatic unit 120 is conditioned to power the motor shaft forwardly. In low forward drive the forward drive clutch 165 is engaged to rotate the shaft 172 and connected intermediate clutch driving member 174 in the reverse direction to condition the intermediate drive clutch 175 for a subsequent upshift to intermediate drive. Similarly, in low reverse drive the reverse drive clutch 180 is engaged to rotate the shaft 172 and connected intermediate clutch driving member 174 in the forward direction to condition the intermediate drive clutch 175 for a subsequent upshift to intermediate drive in reverse.

The shift from low to intermediate drive range in forward and reverse is accomplished when the above synchronous condition of rotational intermediate drive clutch member speed is reached in low forward drive and low reverse drive, respectively. The low drive brake 184 is released and the intermediate drive clutch 175 is then engaged and the gear set 152 becomes passive since it has no reaction. The mechanical drive and hydrostatic drive are now combined in the gear set 155 and by the arrangement of the drive connections of gear set 155, the direction of motor rotation driving the sun gear 154 is opposite the direction of rotation of the carrier 160 and connected propulsion output shaft 162. Thus, the motor drive subtracts from the drive of the carrier 160 and output shafts 114, 116 at the initiation of intermediate drive, the connected steer sun gears 216, 218 providing the reaction in the steer units. Accordingly, the output shaft speed of the steer units in intermediate forward drive with forward drive clutch 165 engaged is increased by reducing the motor speed to zero to maximum motor speed in the forward direction. Similarly, steer unit output shaft speed in the intermediate reverse drive range with reverse drive clutch 180 engaged is increased by reducing motor speed from maximum reverse speed to zero to maximum forward speed. Downshifting from intermediate to low also occurs with synchronous condition in the low drive brake 184 by the drive to the carrier 185 in intermediate drive.

During operation in the intermediate drive range the other sun gear 151 is rotating at motor speed and the ring gear 158 is rotating at the same speed and in the same direction as shaft 162 and these rotations combine in the gear set 152 to cause the carrier 185 to rotate at an intermediate speed in the same direction as shaft 162. The ratios of the planetary gearing (gear sets 152, 155) the gearing between carrier 185 and high clutch driven member 192 (gears 189, 188) and the gearing between the input shaft 130 and high clutch driving member 176 (gears 132, 134, 136) are determined so that when propulsion motor speed reaches its maximum value in intermediate drive, the high clutch driven member 192 is driven by carrier 185 at the same speed and in the same direction as the high clutch driving member 176 when motor shaft 150 is driven in a direction opposite shaft 172.

The shift from intermediate to high drive range in forward and reverse is accomplished when the above synchronous condition of rotational high drive clutch member speed is reached in intermediate forward drive and intermediate reverse drive, respectively. The intermediate clutch 175 is released and the high drive clutch 178 is then engaged. The mechanical drive and hydrostatic drive is now combined in the gear set 152 and by the arrangement of the drive connections of gear set 152, the direction of motor rotation for the sun gear 151 is the same as that of the ring gear 158 at the initiation of high drive and therefore the motor drive subtracts from the drive of ring gear 158 and shaft 162 at the lowest steer unit output shaft speed in high drive, the connected steer sun gears 216, 218 providing reaction in the steer units. Thus, steer unit output shaft speed in the high forward drive with forward drive clutch 165 engaged is increased by reducing the motor speed from maximum forward speed to zero to maximum motor speed in the reverse direction. Similarly, steer unit output shaft speed in the high reverse drive range with reverse drive clutch 180 engaged is increased by reducing motor speed from maximum forward speed to zero to maximum reverse speed. Downshifting from high to intermediate drive also occurs with a synchronous condition in the intermediate drive clutch 175 by the drive to the ring gear 193 of the gear set 155 in the high drive range.

Describing now the steering operation, in the low, intermediate and the high drive ranges and in either forward or reverse, steering of the differential type is accomplished by control of the steer controls 250, 252 to condition the motor 230 to drive the shaft 228. With shaft 228 now being driven in either the forward or reverse direction, the steer sun gears 216, 218, which provided only reaction in the drive ranges, are now caused to rotate in opposite directions at the same speed whereby the steer unit output shafts are caused to rotate a differential speeds. For example, when the right steer sun gear 216 is caused to be driven in the same direction as the right steer ring gear 200 by the motor 230, it adds to the output drive by the steer ring gear 200 to increase the speed of the right output shaft 114 while the other steer sun gear 218 subtracts from the drive of its steer ring gear 208 to decrease the speed of output shaft 116 by the same amount that the speed of shaft 114 has been increased.

Thus the power train provides full hydrostatic drive in the low drive range and split torque drive in the intermediate and high drive range in forward and reverse with a single hydrostatic propulsion unit and synchronous speed single brake and clutch engagement. In addition, the power train provides infinitely variable geared differential steering in all drive ranges with a hydrostatic steer unit separate from the hydrostatic propulsion unit.

The above-described preferred embodiment is illustrative of the invetnion which may be modified within the scope of the appended claims.

We claim:

1. In a power train the combination of an input shaft; a right and a left output shaft; a right and a left steer planetary gear unit each having a propulsion input member, a steer input member and an output member, said output member of said left and right steer gear set being connected to said left and right output shaft respectively, a direction reversing gear train including a steer shaft connecting said steer input members for rotating said steer input members in opposite directions and at the same speed when said steer shaft is driven; a power combining planetary gear unit having a plurality of members, at least one member of said power gear unit connected to said left and right propulsion input member, a brake for holding a second member of said power gear unit; a mechanical drive including a drive clutch for selectively connecting and disconnecting said input shaft and a third member of said power gear unit; an infinitely variable hydrostatic drive for operatively connecting said input shaft to a fourth member of said power gear unit; and an infinitely variable hydrostatic drive for operatively connecting said input shaft to said steer shaft.

2. In a power train the combination of an input shaft; a right and a left output shaft; a right and a left steer planetary gear unit each having a steer gear set comprising a sun gear, a ring gear and a carrier with pinions meshing with said sun and ring gear, said carrier of said left and right steer gear set being connected to said left and right output shaft respectively, a direction reversing gear train including a steer shaft connecting said sun gears for rotating said sun gears in opposite directions at the same speed when said steer shaft is driven; a power combining planetary gear unit having a pair of power gear sets each having a sun gear, a ring gear and a carrier with pinions meshing with said sun and ring gear, one of said ring gears and one of said carriers of said power gear unit being connected to said left and right steer ring gear, a low drive brake for holding the other carrier of said power gear unit; a mechanical drive for selectively connecting said input shaft to said other carrier and said other ring gear of said power gear unit including a power transfer shaft, forward drive means including a forward drive clutch and reverse drive means including a reverse drive clutch for selectively connecting said input shaft to said power transfer shaft, an intermediate drive clutch for connecting said power transfer shaft to said other ring gear of said power gear unit, a high drive clutch for connecting said power transfer shaft to said other carrier of said power gear unit; an infinitely variable hydraulic drive operatively connecting said input shaft to said power gear unit comprising a pump operatively connected to said input shaft, a motor hydraulically connected to said pump, said motor being connected to drive both said sun gears of said power gear unit and an infinitely variable hydraulic drive connecting said input shaft to said steer shaft comprising a pump operatively connected to said input shaft, a motor hydraulically connected to said pump and selectively conditionable to drive said steer shaft.

References Cited

UNITED STATES PATENTS

| | | | |
|---|---|---|---|
| 1,991,094 | 2/1935 | Higley | 74—720.5 X |
| 2,689,489 | 9/1954 | Storez et al | 74—710.5 |
| 3,199,376 | 8/1965 | De Lalio | 74—720.5 |
| 3,250,151 | 5/1966 | Binger | 74—720.5 |
| 3,373,636 | 3/1968 | Livezey et al. | 74—720.5 |
| 3,383,953 | 5/1968 | Christenson | 74—720.5 |

DONLEY J. STOCKING, *Primary Examiner.*

THOMAS C. PERRY, *Assistant Examiner.*